US010061188B2

(12) United States Patent
Wang et al.

(10) Patent No.: US 10,061,188 B2
(45) Date of Patent: Aug. 28, 2018

(54) ILLUMINATION SYSTEM AND PROJECTION APPARATUS HAVING REFLECTION COVER

(71) Applicant: Coretronic Corporation, Hsin-Chu (TW)

(72) Inventors: Chi-Hsun Wang, Hsin-Chu (TW); Chang-Hsuan Chen, Hsin-Chu (TW); Hsuan-I Wu, Hsin-Chu (TW); Ko-Shun Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 15/481,462

(22) Filed: Apr. 7, 2017

(65) Prior Publication Data

US 2017/0293212 A1    Oct. 12, 2017

(30) Foreign Application Priority Data

Apr. 8, 2016    (CN) .......................... 2016 1 0217139

(51) Int. Cl.
*G03B 21/20*    (2006.01)
*F21V 29/70*    (2015.01)
(Continued)

(52) U.S. Cl.
CPC ............ *G03B 21/2066* (2013.01); *F21V 7/06* (2013.01); *F21V 7/08* (2013.01); *F21V 9/30* (2018.02);
(Continued)

(58) Field of Classification Search
CPC .......... F21V 13/08; F21V 13/12; F21V 29/70; F21V 7/06; F21V 7/08; F21V 9/16;
(Continued)

(56) References Cited

U.S. PATENT DOCUMENTS

2002/0180938 A1    12/2002  Bok
2009/0284148 A1    11/2009  Iwanaga
(Continued)

FOREIGN PATENT DOCUMENTS

CN    103597277    2/2014
EP    2360523    8/2011
(Continued)

OTHER PUBLICATIONS

"Search Report of Europe Counterpart Application," dated Aug. 9, 2017, p. 1-p. 8.

*Primary Examiner* — Sultan Chowdhury
*Assistant Examiner* — Magda Cruz
(74) *Attorney, Agent, or Firm* — JCIPRNET

(57) ABSTRACT

An illumination system including at least one light source, a reflection cover, a wavelength conversion element, and a filter element is provided. A focal point of the reflection cover is disposed on an extension line of a transmission path of an excitation beam provided by the light source, and an opening of the reflection cover is adjacent to the focal point. The wavelength conversion element penetrates through the opening, and has a light-action region. The light-action region is disposed on the transmission path of the excitation beam, and converts the excitation beam into a conversion beam. The reflection cover is disposed on a transmission path of the conversion beam. The filter element is disposed on a transmission path of the conversion beam from the reflection cover. The conversion beam from the reflection cover is obliquely incident to the filter element, and the filter element filters the conversion beam.

19 Claims, 10 Drawing Sheets

(51) Int. Cl.
*F21V 7/06* (2006.01)
*F21V 7/08* (2006.01)
*F21V 13/08* (2006.01)
*F21V 13/12* (2006.01)
*G02B 27/48* (2006.01)
*G03B 21/16* (2006.01)
*F21V 9/30* (2018.01)
*F21Y 115/30* (2016.01)
*G03B 21/00* (2006.01)
*F21K 9/64* (2016.01)

(52) U.S. Cl.
CPC .............. *F21V 13/08* (2013.01); *F21V 13/12* (2013.01); *F21V 29/70* (2015.01); *G02B 27/48* (2013.01); *G03B 21/16* (2013.01); *G03B 21/204* (2013.01); *G03B 21/208* (2013.01); *G03B 21/2093* (2013.01); *F21K 9/64* (2016.08); *F21Y 2115/30* (2016.08); *G03B 21/005* (2013.01)

(58) Field of Classification Search
CPC ...... G02B 27/48; G03B 21/16; G03B 21/204; G03B 21/2066; G03B 21/208; G03B 21/2093; G03B 21/005; F21K 9/64; F21Y 2115/30

See application file for complete search history.

(56) References Cited

U.S. PATENT DOCUMENTS

| | | | |
|---|---|---|---|
| 2011/0199580 A1* | 8/2011 | Hirata | G03B 21/20 353/31 |
| 2012/0002173 A1 | 1/2012 | Akiyama | |
| 2012/0033185 A1 | 2/2012 | Chang | |
| 2012/0206900 A1 | 8/2012 | Yang et al. | |
| 2012/0300178 A1 | 11/2012 | Sugiyama et al. | |
| 2012/0320344 A1 | 12/2012 | Okumura | |
| 2013/0100644 A1 | 4/2013 | Hu et al. | |
| 2013/0258292 A1 | 10/2013 | Lin | |
| 2013/0271947 A1 | 10/2013 | Finsterbusch et al. | |
| 2016/0004148 A1* | 1/2016 | Chiu | G03B 21/204 353/84 |

FOREIGN PATENT DOCUMENTS

| | | |
|---|---|---|
| EP | 2407825 | 1/2012 |
| TW | I503578 | 10/2015 |

* cited by examiner

ILLUMINATION SYSTEM AND PROJECTION APPARATUS HAVING REFLECTION COVER

CROSS-REFERENCE TO RELATED APPLICATION

This application claims the priority benefit of China application serial no. 201610217139.0, filed on Apr. 8, 2016. The entirety of the above-mentioned patent application is hereby incorporated by reference herein and made a part of this specification.

BACKGROUND OF THE INVENTION

Field of the Invention

The invention relates to an illumination system and a projection apparatus.

Description of Related Art

A projector uses a laser beam emitted by a laser source to excite a phosphor in a phosphor wheel, and the excited phosphor provides conversion beams of different colors. Conventionally, before the laser beam irradiates the phosphor wheel, the laser beam first passes through a dichroic mirror, and is then transmitted to the phosphor wheel. A function of the dichroic mirror is, for example, pervious to the light beam with a specific light wavelength range and reflects the light beam with another specific light wavelength range. When the laser beam passes through the dichroic mirror and is transmitted to the phosphor of the phosphor wheel, the phosphor is excited by the laser beam to emit the conversion beams of different wavelengths, and the conversion beams are transmitted to the dichroic mirror along a path opposite to a transmission path of the laser beam, and are reflected to other components in the projector by the dichroic mirror. An initial design concept of the dichroic mirror is to allow the wavelength corresponding to the laser beam to penetrate there through, and reflect the wavelength corresponding to the conversion beams emitted by the excited phosphor, and is not adapted to reflect the wavelength corresponding to the laser beam. Therefore, when a part of the laser beam is not reacted with the phosphor and is reflected back to the dichroic mirror by the phosphor wheel, the laser beam may directly penetrate through the dichroic mirror to transmit back to the original laser source.

In order to resolve the above problem, in a general projector, a plurality of extra optical guide elements and optical paths are configured in the phosphor wheel. The laser beam passing through the dichroic mirror may penetrate through a transparent region of the phosphor wheel, and is guided by the aforementioned optical guide elements and the corresponding optical paths, a direction of the laser beam incident to the dichroic mirror is changed after the laser beam passes through the dichroic mirror, and the above direction is different to the direction along which the original laser beam is incident to the dichroic mirror. In this way, the laser beam passing through the dichroic mirror is guided by the aforementioned optical guide elements and is again incident to and penetrates through the dichroic mirror, and is transmitted to the other components in the projector. However, by using the aforementioned optical guide elements and additionally design optical paths in the projector, the volume of the projector is relatively large, and the cost thereof is high.

Moreover, when the laser beam continuously irradiates the phosphor on the phosphor wheel, a large amount of heat is generated, which causes a phenomenon that an intensity of the conversion beam generated by the phosphor is greatly decreased along with increase of temperature, such that an image brightness of the projector is decreased along with increase of an operation time of the projector, which results in poor reliability of the projector. Moreover, in the projector using the laser light source, a speckle phenomenon is always one of important factors causing reduction of the image quality, and the speckle phenomenon causes poor image quality of the projector. Therefore, to resolve the aforementioned problems becomes an important task for related technicians of the field.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The invention is directed to an illumination system, which has advantages of small volume and simple design of optical path.

The invention is directed to a projection apparatus, which has the aforementioned illumination system, and has advantages of small volume and simple design of optical path.

Other objects and advantages of the invention can be further illustrated by the technical features broadly embodied and described as follows.

In order to achieve one or a portion of or all of the objects or other objects, an embodiment of the invention provides a projection apparatus including an illumination system, a light valve, and an imaging system. The illumination system includes at least one light source, a reflection cover, a wavelength conversion element, and a filter element. The at least one light source is adapted to provide at least one excitation beam. The reflection cover has a focal point and an opening. The focal point of the reflection cover is disposed on an extension line of a transmission path of the excitation beam, and the opening is disposed adjacent to the focal point. The wavelength conversion element penetrates through the opening. The wavelength conversion element has a light-action region. The light-action region of the wavelength conversion element is disposed on the transmission path of the excitation beam, and is disposed adjacent to the focal point of the reflection cover, and is adapted to convert the excitation beam into a conversion beam. The reflection cover is disposed on a transmission path of the conversion beam from the wavelength conversion element. The filter element is disposed on a transmission path of the conversion beam from the reflection cover. The conversion beam from the reflection cover is obliquely incident to the filter element, and the filter element is adapted to filter the conversion beam into an illumination beam. The light valve is disposed on a transmission path of the illumination beam, and is adapted to convert the illumination beam into an image beam. The imaging system is disposed on a transmission path of the image beam.

In order to achieve one or a portion of or all of the objects or other objects, an embodiment of the invention provides an illumination system including at least one light source, a reflection cover, a wavelength conversion element, and a filter element. The at least one light source is adapted to provide at least one excitation beam. The reflection cover has a focal point and an opening. The focal point of the reflection cover is disposed on an extension line of a transmission path of the excitation beam, and the opening is disposed adjacent to the focal point. The wavelength conversion element penetrates through the opening, and has a light-action region. The light-action region of the wavelength conversion element is disposed on the transmission path of the excitation beam, and is disposed adjacent to the focal point of the reflection cover, and is adapted to convert the excitation beam into a conversion beam. The reflection cover is disposed on a transmission path of the conversion beam from the wavelength conversion element. The filter element is disposed on a transmission path of the conversion beam from the reflection cover. The conversion beam from the reflection cover is obliquely incident to the filter element, and the filter element is adapted to filter the conversion beam.

According to the above description, the embodiment of the invention has at least one of the following advantages or effects. In the illumination system of the embodiment of the invention, the focal point of the reflection cover is disposed on the extension line of the transmission path of the excitation beam, so that the excitation beam emitted by the light source is reflected to the focal point of the reflection cover. In the embodiment of the invention, since the light-action region of the wavelength conversion element is disposed adjacent to the focal point of the reflection cover, when the excitation beam is converted into the conversion beam by the light-action region of the wavelength conversion element, a position (i.e. the light-action region) where the conversion beam is emitted is also adjacent to the focal point of the reflection cover, so that the illumination system is unnecessary to configure additional optical guide elements or optical path to guide the excitation beam. Therefore, the illumination system of the embodiment of the invention has advantages of small volume, simple design of optical path and low cost, etc. Further, since the projection apparatus of the embodiment of the invention includes the aforementioned illumination system, the projection apparatus of the embodiment of the invention also has the advantages of small volume, simple design of optical path and low cost, etc.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

The present invention will now be described more fully with reference to the accompanying drawings, in which exemplary embodiments of the invention are shown. The terms used herein such as "above", "below", "front", "back", "left" and "right" are for the purpose of describing directions in the figures only and are not intended to be limiting of the invention.

Figure 1:
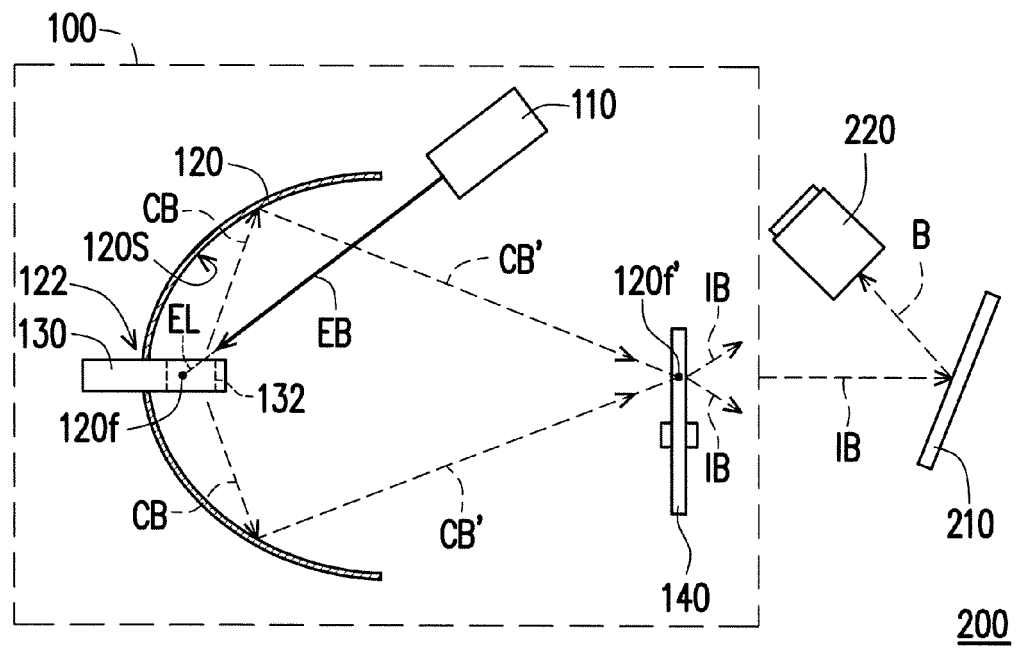
FIG. 1 is a schematic diagram of a projection apparatus according to an embodiment of the invention.

FIG. 1 is a schematic diagram of a projection apparatus according to an embodiment of the invention. Referring to FIG. 1, in the embodiment, the projection apparatus 200 includes an illumination system 100, a light valve 210, and an imaging system 220. The illumination system 100 includes at least one light source 110, a reflection cover 120, a wavelength conversion element 130, and a filter element 140. The at least one light source 110 in the illumination system 100 is adapted to provide at least one excitation beam EB. In the embodiment, the number of the at least one light source 110 is one, and the at least one excitation beam EB is one excitation beam EB, though the invention is not limited thereto. The reflection cover 120 has a focal point 120*f* and an opening 122. The focal point 120*f* of the reflection cover 120 is disposed/located on an extension line EL of a transmission path of the excitation beam EB, and the opening 122 of the reflection cover 120 is disposed/located adjacent to the focal point 120*f* of the reflection cover 120. The wavelength conversion element 130 penetrates through the opening 122, and has a light-action region 132. The light-action region 132 of the wavelength conversion element 130 is disposed/located on the transmission path of the excitation beam EB, and is disposed/located adjacent to the focal point 120*f* of the reflection cover 120. In the embodiment, a part of the light-action region 132 of the wavelength conversion element 130 may pass through the focal point 120f of the reflection cover 120. The light-action region 132 of the wavelength conversion element 130 is adapted to convert the excitation beam EB into a conversion beam CB. The reflection cover 120 is disposed/located on a transmission path of the conversion beam CB coming from the wavelength conversion element 130, and reflects the conversion beam CB to the filter element 140. The filter element 140 is disposed/located on the transmission path of the conversion beam CB' coming from the reflection cover 120. The conversion beam CB' coming from the reflection cover 120 is obliquely incident to the filter element 140. In the embodiment, the filter element 140 is adapted to filter the reflected conversion beam CB' into an illumination beam IB. The light valve 210 is disposed/located on a transmission path of the illumination beam IB, and is adapted to convert the illumination beam IB into an image beam B. The imaging system 220 is disposed/located on a transmission path of the image beam B.

According to the above description, in the embodiment, the wavelength conversion element 130 is adapted to sequentially convert the excitation beam EB coming from the light source 110 into the conversion beam CB of a plurality of different colors (for example, a red color, a green color, a yellow color), though the invention is not limited thereto. Then, the conversion beam CB' reflected by the reflection cover 120 is filtered by the filter element 140 to form the illumination beam IB. In the embodiment, the filter element 140 may filter the conversion beam CB' with a broader light wavelength spectrum range into the illumination beam IB with a narrower light wavelength spectrum range. In this way, by using the filter element 140 to filter the conversion beam CB', color purity of the light beam provided by the illumination system 100 is enhanced. Then, in the embodiment, the light valve 210 may convert the illumination beam IB coming from the filter element 140 into the image beam B, and then the imaging system 220 may receive the image beam B and projects the image beam B to generate an image.

To be specific, in the embodiment, the light source 110, for example, includes an excitation light source (not shown) and a light converging element (not shown). The excitation light source includes, for example, a laser diode or a light-emitting diode, which is not limited by the invention. In the embodiment, the light converging element is adapted to convert a light beam coming from the excitation light source to form the excitation beam EB. The light converging element is, for example, a convex lens or a combination of a plurality of lenses, which is not limited by the invention. The wavelength spectrum range of the excitation beam EB emitted by the light source 110 is, for example, a blue light, an ultraviolet light or other light with a shorter wavelength, which is not limited by the invention.

The wavelength conversion element 130 is, for example, a phosphor wheel, though the invention is not limited thereto. The filter element 140 is, for example, filter wheel, though the invention is not limited thereto. In the embodiment, the light valve 210 is, for example, a digital micromirror device (DMD), and the DMD may sequentially convert the illumination beam IB of different colors sequentially coming from the filter element 140 into the image beam B of the corresponding color, though the invention is not limited thereto. In other embodiments, the light valve 210 may also be a liquid-crystal-on silicon panel (LCOS panel) or a liquid crystal display panel (LCD panel), which is not limited by the invention. The imaging system 220 is, for example, a projection lens, though the invention is not limited thereto.

According to the above description, compared to the traditional techniques, the illumination system 100 of the embodiment is unnecessary to use additional optical guide elements to guide the excitation beam EB. Meanwhile, the illumination system 100 of the embodiment is unnecessary to configure additional optical paths to guide the excitation beam EB. Therefore, the illumination system 100 of the embodiment has advantages of small volume, simple design of optical path and low cost, etc. Further, since the projection apparatus 200 of the embodiment includes the aforementioned illumination system 100, the projection apparatus 200 of the embodiment also has the advantages of small volume, simple design of optical path and low cost, etc.

Referring to FIG. 1, in the embodiment, a surface 120S of the reflection cover 120 is a partial ellipsoidal surface (ellipsoid) having the focal point 120f. In the embodiment, the surface 120S of the reflection cover 120 is adapted to reflect the conversion beam CB or the excitation beam EB coming from the wavelength conversion element 130, and a situation that the reflection cover 120 reflects the conversion beam CB is illustrated and a situation that the reflection cover 120 reflects the excitation beam EB is not illustrated in FIG. 1. Another focal point 120f' of the partial ellipsoidal surface (ellipsoid) is away from the wavelength conversion element 130, and is disposed/located adjacent to the filter element 140. In the embodiment, the conversion beam CB is emitted from the light-action region 132 near the focal point 120f, and is reflected by the surface 120S of the reflection cover 120 to form the conversion beam CB', and then the conversion beam CB' is propagated to the other focal point 120f' of the partial ellipsoidal surface (ellipsoid) to reach the filter element 140.

Reference numbers of the components and a part of contents of the aforementioned embodiment are also used in the following embodiment, wherein the same reference numbers denote the same or like components, and descriptions of the same technical contents are omitted.

Figure 2:
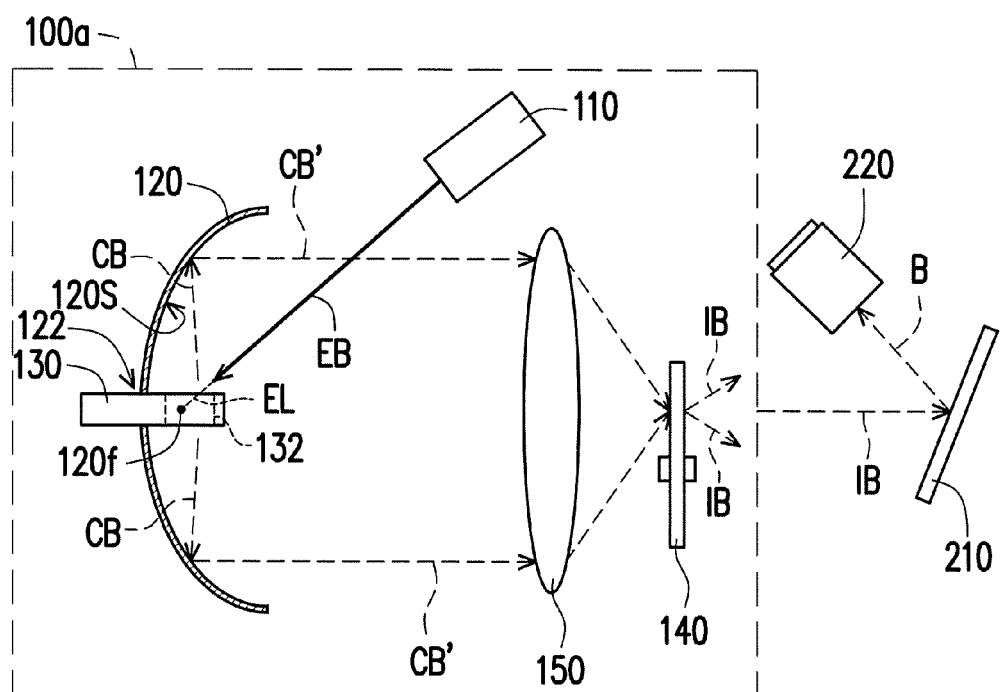
FIG. 2 is a schematic diagram of a projection apparatus according to another embodiment of the invention.

FIG. 2 is a schematic diagram of a projection apparatus according to another embodiment of the invention. Referring to FIG. 2, the projection apparatus 200a of the embodiment is similar to the projection apparatus 200 of FIG. 1, and a main difference there between is that the surface 120S of the reflection cover 120 is a parabolic surface having the focal point 120f, and the illumination system 100a further includes a converging lens 150. In the embodiment, the surface 120S of the reflection cover 120 is adapted to reflect the conversion beam CB or the excitation beam EB coming from the wavelength conversion element 130, and the situation that the reflection cover 120 reflects the conversion beam CB is illustrated and the situation that the reflection cover 120 reflects the excitation beam EB is not illustrated in FIG. 2. In the embodiment, the conversion beam CB is emitted from the light-action region 132 near the focal point 120f, and is reflected by the surface 120S (i.e. the parabolic surface) of the reflection cover 120 to form the parallel conversion beam CB', and then the conversion beam CB' is incident to converging lens 150 in parallel (parallelly). In the embodiment, the converging lens 150 converges the conversion beam CB' coming from the parabolic surface (i.e. the surface 120S) to the filter element 140.

Figure 3:
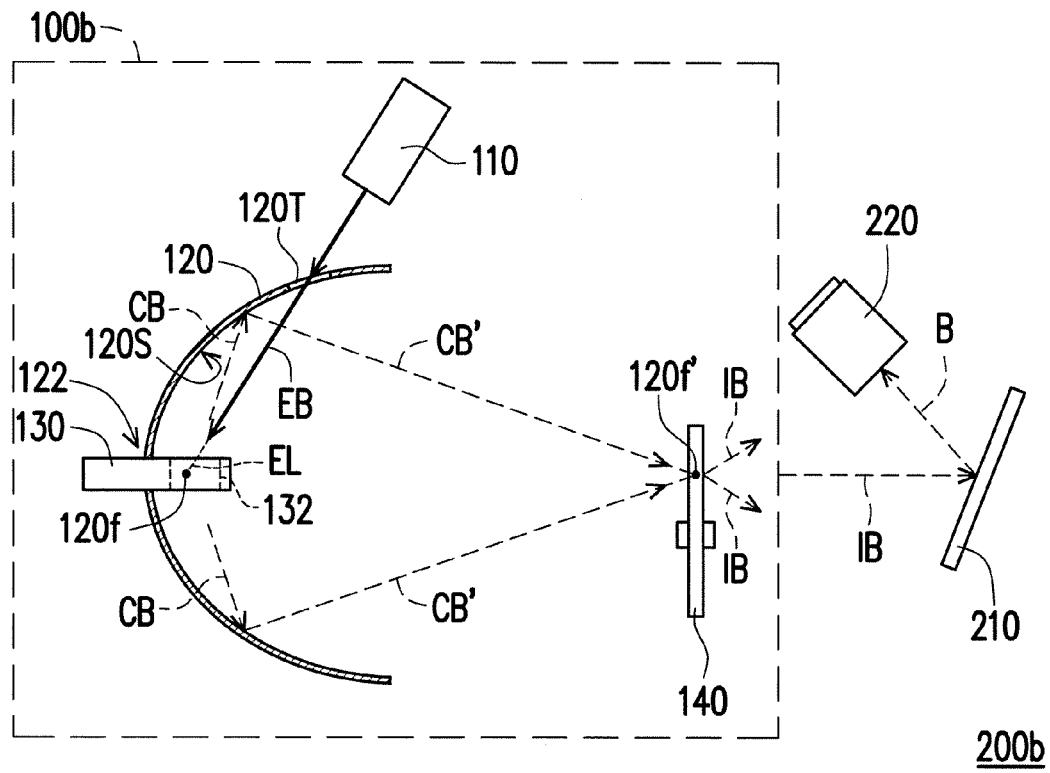
FIG. 3 is a schematic diagram of a projection apparatus according to another embodiment of the invention.

FIG. 3 is a schematic diagram of a projection apparatus according to another embodiment of the invention. Referring to FIG. 3, the projection apparatus 200b of the embodiment is similar to the projection apparatus 200 of FIG. 1, and a main difference there between is that the reflection cover 120 in the illumination system 100b has a light transparent portion 120T, and a position of the light transparent portion 120T corresponds to the transmission path of the excitation beam EB. To be specific, in the embodiment, the excitation beam EB is emitted to the focal point 120f of the reflection cover 120 though the light transparent portion 120T of the reflection cover 120, wherein the light transparent portion 120T may be an opening, a transparent glass or a transparent plastic, which is not limited by the invention.

Figure 4:
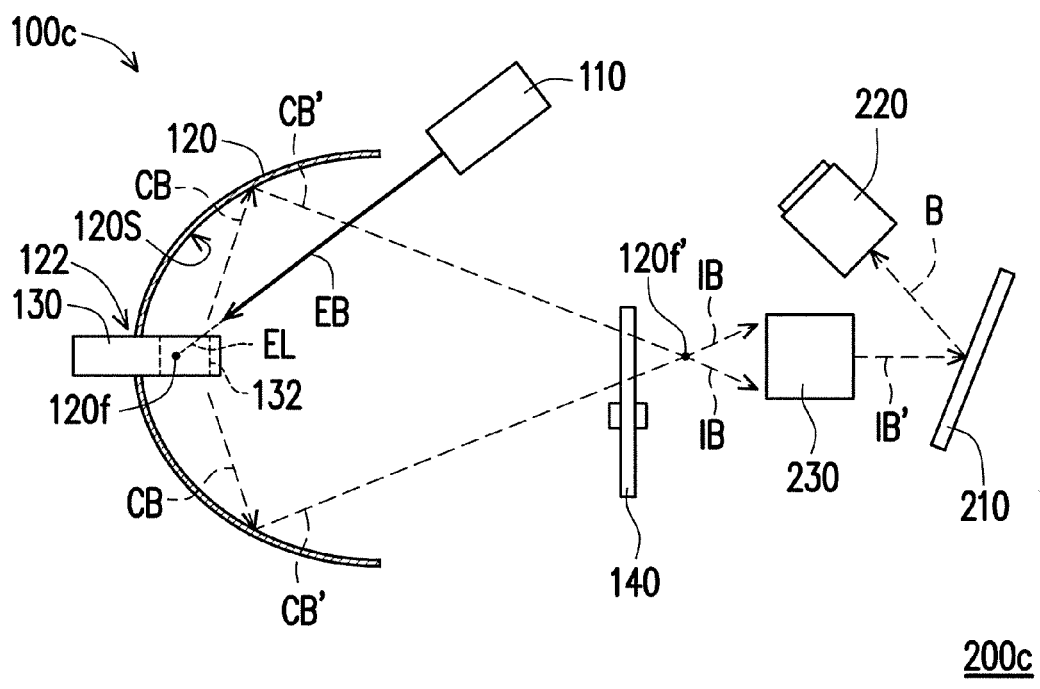
FIG. 4 is a schematic diagram of a projection apparatus according to another embodiment of the invention.

FIG. 4 is a schematic diagram of a projection apparatus according to another embodiment of the invention. Referring to FIG. 4, the projection apparatus 200c of the embodiment is similar to the projection apparatus 200 of FIG. 1, and a main difference there between is that the projection apparatus 200c further includes a light optimization element 230, wherein the light optimization element 230 is disposed/located between the filter element 140 and the light valve 210, and the other focal point 120f' of the reflection cover 120 in the illumination system 100c is disposed/located between the filter element 140 and the light optimization element 230. In the embodiment, the light optimization element 230 includes an integration rod (not shown), and the integration rod is disposed/located on the transmission path of the illumination beam IB coming from the filter element 140, and is adapted to uniform the illumination beam IB. In the embodiment, the light optimization element 230 may also include a converging element (not shown), wherein the converging element is disposed/located between the integration rod and the light valve 210, and is adapted to converge a uniform light beam coming from the integration rod into a parallel light beam incident to the light valve 210. In this way, the light optimization element 230 may optimize the illumination beam IB coming from the filter element 140 into an illumination beam IB'. Moreover, other embodiment that is not illustrated, the other focal point 120f' of the reflection cover 120 is, for example, disposed/located between the filter element 140 and the light valve 210. Preferably, in the embodiment, the other focal point 120f' of the reflection cover 120 is, for example, disposed/located between the filter element 140 and the integration rod of the light optimization element 230. In some embodiments that are not illustrated, another focal point 120f' of the reflection cover 120 may also be disposed/located at a light incident end of the integration rod of the light optimization element 230, which is not limited by the invention.

Figure 5:
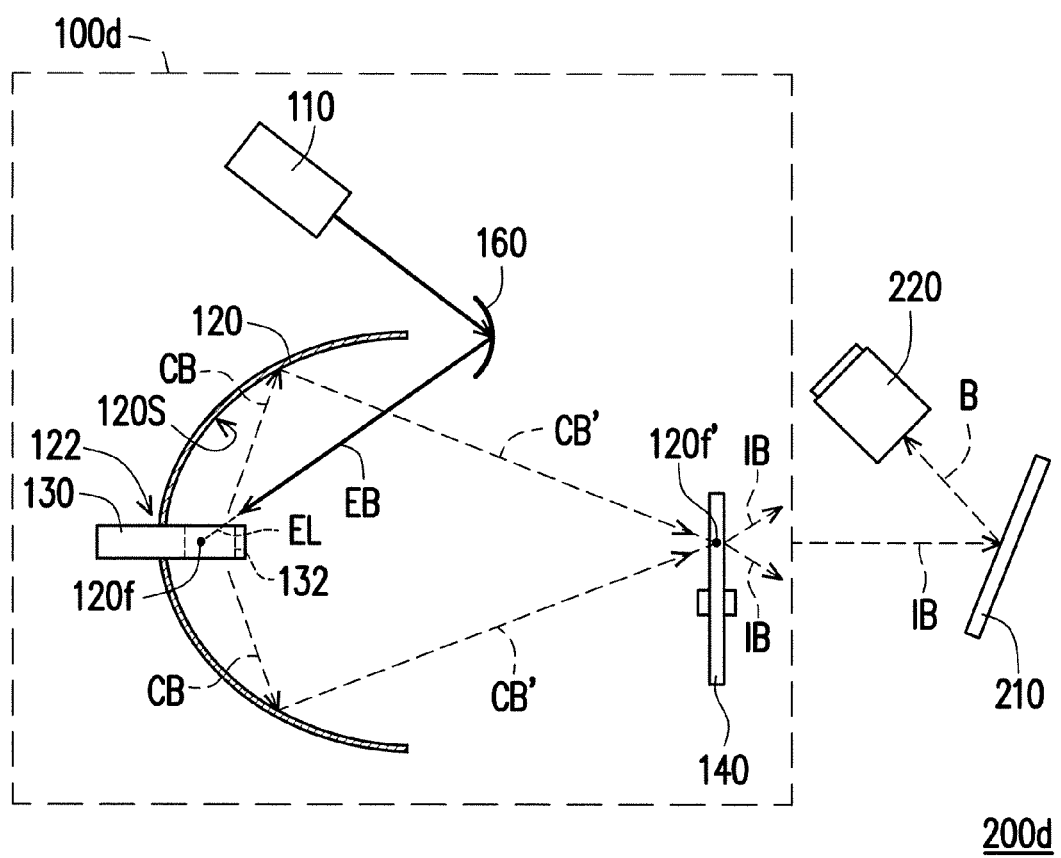
FIG. 5 is a schematic diagram of a projection apparatus according to another embodiment of the invention.

FIG. 5 is a schematic diagram of a projection apparatus according to another embodiment of the invention. Referring to FIG. 5, the projection apparatus 200d of the embodiment is similar to the projection apparatus 200 of FIG. 1, and a main difference there between is that the illumination system 100d further includes a reflection mirror 160. The reflection mirror 160 is disposed/located between the light source 110 and the wavelength conversion element 130, and is disposed/located on the transmission path of the excitation beam EB. The reflection mirror 160 is adapted to change a propagating direction of the excitation beam EB to reflect the excitation beam EB coming from the light source 110 to the wavelength conversion element 130. In the embodiment, the number of the reflection mirror 160 is one, though the invention is not limited thereto, and in some embodiments, the number of the reflection mirror 160 is, for example, plural, which is shown in FIG. 6, though the invention is not limited thereto.

Figure 6:
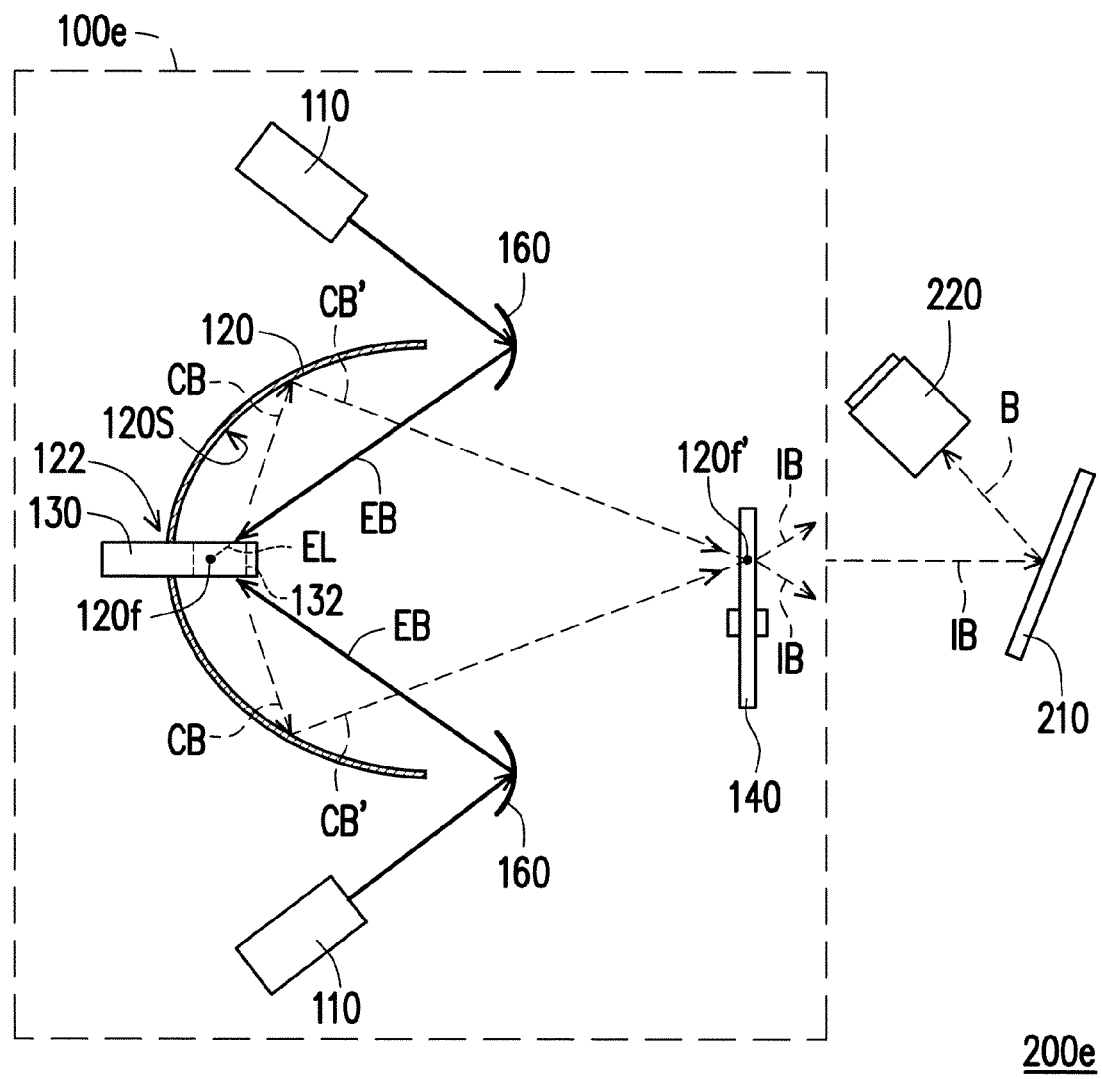
FIG. 6 is a schematic diagram of a projection apparatus according to another embodiment of the invention.

FIG. 6 is a schematic diagram of a projection apparatus according to another embodiment of the invention. Referring to FIG. 6, the projection apparatus 200e of the embodiment is similar to the projection apparatus 200d of FIG. 5, and a main difference there between is that the at least one light source 110 in the illumination system 100e is, for example, a plurality of light sources 110, and the at least one excitation beam EB is, for example, a plurality of excitation beams EB, for example, two light sources 110 and two rays of excitation beams EB. In the embodiment, the two light sources 110 respectively emit the two rays of the excitation beams EB. In the embodiment, the excitation beam EB are first reflected by the reflection mirrors 160 to reach the focal point 120f of the reflection cover 120. In the embodiment, two light sources 110 and the two rays of the excitation beams EB are taken as example for description, and in other embodiments, the number of the light sources 110 and the excitation beams EB may be dynamically adjusted according to different brightness requirements, for example, three or more light sources 110 surround the reflection cover 120, which is not limited by the invention.

According to the above description, in other embodiments, the excitation beam EB is, for example, directly emitted to the focal point 120f of the reflection cover 120 without using the reflection mirror 160, though the invention is not limited thereto. Alternatively, in some embodiments, the excitation beam EB, for example, penetrates through the reflection cover 120 via the light transparent portion 120T of the reflection cover 120 to reach the focal point 120f of the reflection cover 120 without using the reflection mirror 160, though the invention is not limited thereto.

Different implementations of the wavelength conversion element of the aforementioned embodiments are described in detail below.

Briefly, in the embodiments of FIG. 1 to FIG. 5, one light source 110 is schematically illustrated, and one ray of the excitation beam EB is schematically illustrated. In the embodiment of FIG. 6, two light sources 110 are schematically illustrated, and two rays of the excitation beams EB are schematically illustrated. However, in other embodiment that is not illustrated, three or more light sources 110 may be designed to surround the reflection cover 120 based on a different design, which is not limited by the invention.

Figure 7A:
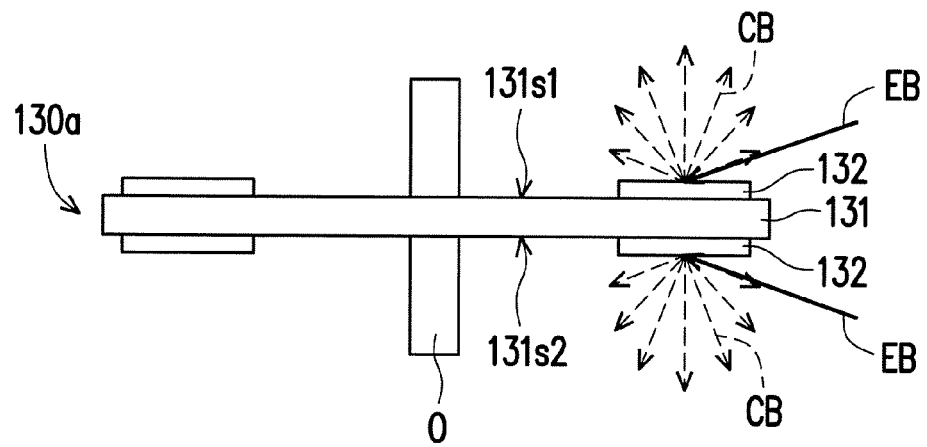
FIG. 7A is a cross-sectional view of a wavelength conversion element according to an embodiment of the invention.
Figure 7B:
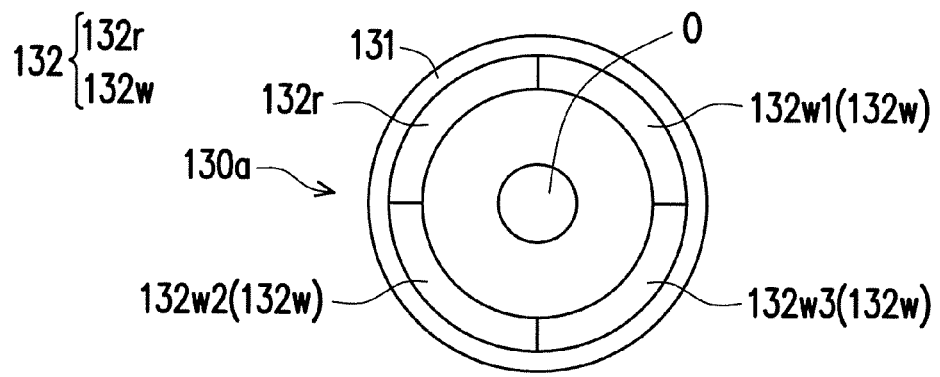
FIG. 7B is a top view of the wavelength conversion element of FIG. 7A.
Figure 7C:
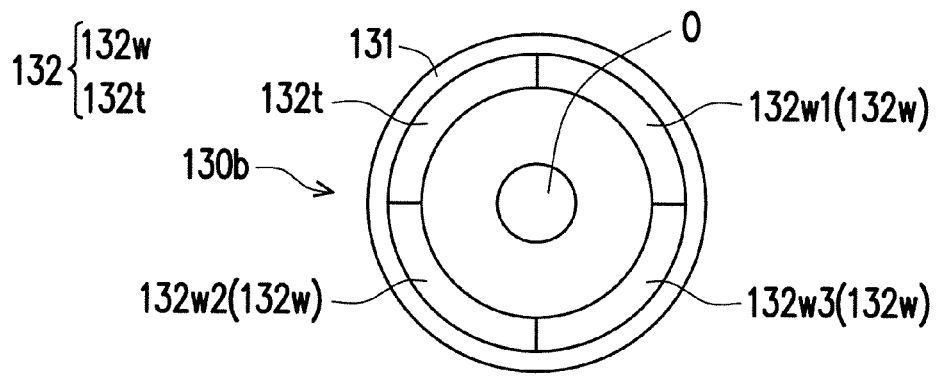
FIG. 7C and FIG. 7D are top views of two wavelength conversion elements according to another embodiment of the invention.
Figure 7D:
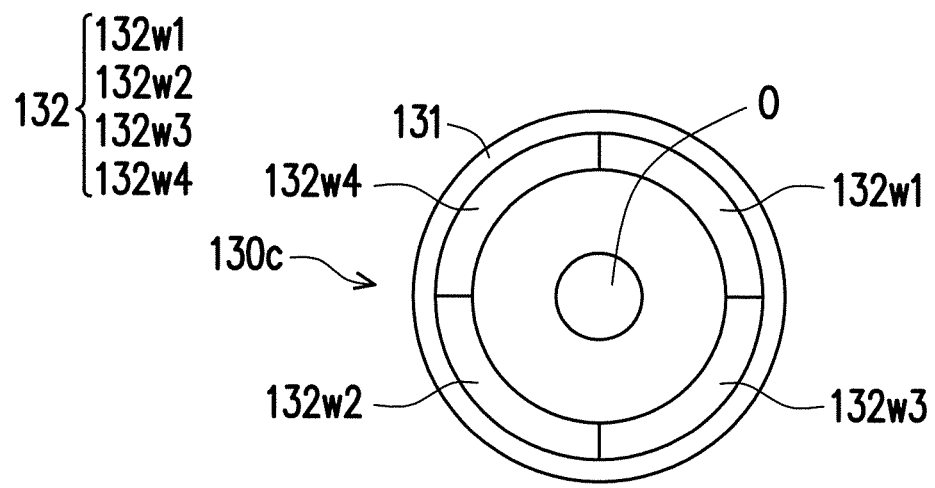
Figure 7E:
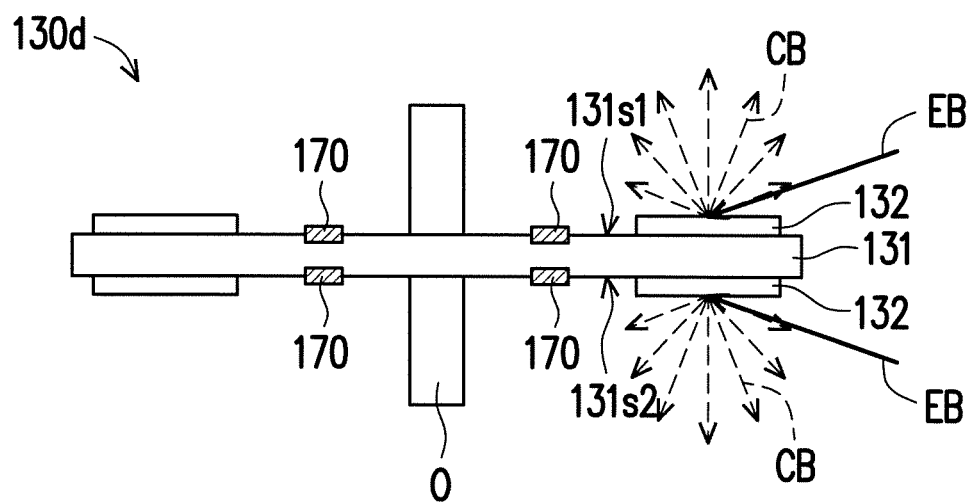
FIG. 7E is a cross-sectional view of a wavelength conversion element according to another embodiment of the invention.

FIG. 7A is a cross-sectional view of one of the wavelength conversion elements of the aforementioned embodiments. FIG. 7B is a top view of the wavelength conversion element of FIG. 7A. FIG. 7C and FIG. 7D are top views of other two wavelength conversion elements in the aforementioned embodiments. FIG. 7E is a cross-sectional view of another one of the wavelength conversion elements of the aforementioned embodiments.

Referring to FIG. 7A and FIG. 7B, in the embodiment, the wavelength conversion element 130a is, for example, a phosphor wheel, which is adapted to rotate relative to a center shaft O. In the embodiment, the wavelength conversion element 130a includes a carrier substrate 131. In the embodiment, the carrier substrate 131 is, for example, a reflective carrier substrate or a reflecting carrier substrate, and a material thereof is, for example, metal, alloy, ceramics, or a combination thereof. In the embodiment, the light-action region 132 of the wavelength conversion element 130a is disposed/located on two opposite surfaces 131s1 and 131s2 of the carrier substrate 131, wherein the light-action region 132 includes at least one wavelength conversion region 132w and a light reflection region 132r. In the embodiment, when the excitation beam EB (shown in FIG. 6) irradiates the wavelength conversion region 132w of the light-action region 132, the wavelength conversion region 132w converts the excitation beam EB into the conversion beam CB, and the conversion beam CB is reflected by the wavelength conversion region 132w. When the excitation beam EB (shown in FIG. 6) irradiates the light reflection region 132r of the light-action region 132, the light reflection region 132r reflects the excitation beam EB. In the embodiment, the number of the wavelength conversion regions 132w is, for example, three, which are respectively a yellow light wavelength conversion region 132w1, a green light wavelength conversion region 132w2, and a red light wavelength conversion region 132w3, though the invention is not limited thereto. In the embodiment, when the wavelength conversion element 130a rotates, the light reflection region 132r, the yellow light wavelength conversion region 132w1, the green light wavelength conversion region 132w2, and the red light wavelength conversion region 132w3 are cut into the transmission path of the excitation beam EB by turns. Moreover, the number of the wavelength conversion regions 132w is not limited to three. In some embodiments, the number of the wavelength conversion regions 132W is, for example, two (for example, the green light wavelength conversion region and the red light wavelength conversion region), in some embodiments, the number of the wavelength conversion region 132w is, for example, one (for example, a blue light wavelength conversion region), which is not limited by the invention.

To be specific, in the embodiment, a yellow light wavelength conversion material is, for example, configured in the yellow light wavelength conversion region 132w1 to convert the excitation beam EB into a yellow color conversion beam CB. A green light wavelength conversion material is, for example, configured in the green light wavelength conversion region 132w2 to convert the excitation beam EB into a green color conversion beam CB. A red light wavelength conversion material is, for example, configured in the red light wavelength conversion region 132w3 to convert the excitation beam EB into a red color conversion beam CB. The wavelength conversion material, for example, includes phosphor or quantum dots, which is not limited by the invention. However, design parameters such as an arranging manner and region area proportions of the yellow light wavelength conversion region 132w1, the green light wavelength conversion region 132w2, the red light wavelength conversion region 132w3, and the light reflection region 132r may be determined according to an actual design requirement, the wavelength conversion element 130a of the embodiment is not limited to the pattern shown in FIG. 7B.

In the embodiment, because the light-action region 132 of the wavelength conversion element 130a is disposed/located on the two opposite surfaces 131s1 and 131s2 of the carrier substrate 131, the excitation beams EB (shown in FIG. 6 and FIGS. 7A-7B) are, for example, designed as two rays of light beams propagated to the light-action region 132 disposed/located on the two different surfaces. Since the conversion beams may be emitted from the light-action region 132 disposed/located on the two different surfaces, in case of a same image brightness output, the light intensity of the excitation beam EB may be decreased to decrease an energy density taken by the wavelength conversion material of the wavelength conversion region 132w, by which a phenomenon of low light-emitting efficiency caused by overheat of the wavelength conversion material under long time irradiation of the excitation beam EB is avoided, so as to improve the reliability of the projection apparatus of the embodiments of the invention.

Moreover, in some embodiments, the light reflection region 132r further has a scattering function. To be specific, a scattering reflective material may be configured on the light reflection region 132r, wherein the scattering reflective material is, for example, barium sulfate, magnesium oxide, titanium oxide, aluminium oxide or a combination thereof, which is not limited by the invention. When the excitation beam EB irradiates the scattering reflective material on the light reflection region 132r, the excitation beam EB (for example, laser light) is evenly scattered, which may effectively decrease the speckle phenomenon of the excitation beam EB, so as to improve the image quality of the projection apparatus of the embodiments of the invention.

Referring to FIG. 7C, the wavelength conversion element 130b shown in FIG. 7C is similar to the wavelength conversion element 130a shown in FIG. 7B, and a main difference there between is that in the embodiment, the light-action region 132 of the wavelength conversion element 130b includes at least one wavelength conversion region 132w and a light transmissive region 132t. The light transmissive region 132t is, for example, an opening of the carrier substrate 131, such that the excitation beam EB may pass there through, and the excitation beam EB passing through the light transmissive region 132t is further transmitted to the reflection cover 120. Moreover, in some embodiments, a transparent material may be further configured in the light transmissive region 132t, i.e. the transparent material is disposed/located on the opening of the carrier substrate 131 to form the light transmissive region 132t. The transparent material is, for example, a transparent glass or a transparent diffuser, wherein the transparent diffuser diffuses the excitation beam EB passing through the light transmissive region 132t, so as to improve the image quality of the projection apparatus of the embodiments of the invention. However, the design parameters such as an arranging manner and region area proportions of the yellow light wavelength conversion region 132w1, the green light wavelength conversion region 132w2, the red light wavelength conversion region 132w3, and the light transmissive region 132t may be determined according to an actual design requirement, the wavelength conversion element 130b of the embodiment is not limited to the pattern shown in FIG. 7C. Moreover, the number of the wavelength conversion regions 132w is not limited to three.

Referring to FIG. 7D, the wavelength conversion element 130c shown in FIG. 7D is similar to the wavelength conversion element 130a shown in FIG. 7B, and a main difference there between is that in the embodiment, the at least one wavelength conversion region of the light-action region 132 is the yellow light wavelength conversion region 132w1, the green light wavelength conversion region 132w2, the red light wavelength conversion region 132w3, and a blue light wavelength conversion region 132w4. A yellow light wavelength conversion material is, for example, configured in the yellow light wavelength conversion region 132w1 to convert the excitation beam EB (shown in FIG. 6) into a yellow color conversion beam CB. A green light wavelength conversion material is, for example, configured in the green light wavelength conversion region 132w2 to convert the excitation beam EB (shown in FIG. 6) into a green color conversion beam CB. A red light wavelength conversion material is, for example, configured in the red light wavelength conversion region 132w3 to convert the excitation beam EB (shown in FIG. 6) into a red color conversion beam CB. A blue light wavelength conversion material is, for example, configured in the blue light wavelength conversion region 132w4 to convert the excitation beam EB (shown in FIG. 6) into a blue color conversion beam CB. In the embodiment, the excitation beam EB is, for example, a blue color excitation beam with a first wavelength, and the blue color conversion beam CB converted by the blue light wavelength conversion region 132w4 has a second wavelength, wherein the first wavelength is smaller than the second wavelength. In other embodiment, a wavelength range of the excitation beam EB is, for example, lower than a wavelength range of the blue light (for example, ultraviolet light), such that the blue light wavelength conversion material may be excited to emit the blue color conversion beam CB. However, design parameters such as an arranging manner and region area proportions of the yellow light wavelength conversion region 132w1, the green light wavelength conversion region 132w2, the red light wavelength conversion region 132w3 and the blue light wavelength conversion region 132w4 may be determined according to an actual design requirement, the wavelength conversion element 130c of the embodiment is not limited to the pattern shown in FIG. 7D.

Referring to FIG. 7E, the wavelength conversion element 130d shown in FIG. 7E is similar to the wavelength conversion element 130a shown in FIG. 7A, and a main difference there between is that in the embodiment, the illumination system further includes a heat dissipation module 170. In the embodiment, the heat dissipation module 170 is fixed on the wavelength conversion element 130d to dissipate heat of the wavelength conversion element 130d. In this way, the heat dissipation module 170 may quickly dissipate the heat of the wavelength conversion material generated under a long time irradiation of the excitation beam EB, such that the phenomenon of low light-emitting efficiency caused by overheat is correspondingly mitigated, and accordingly the reliability of the projection apparatus of the embodiments of the invention is improved. In the embodiment, the heat dissipation module 170 is, for example, a heat dissipation structure formed in internal of the carrier substrate 131, for example, cooling fins, or a heat dissipation assembly in internal of the carrier substrate 131, which is not limited by the invention. However, in other embodiment, the heat dissipation module may be both fixed on the wavelength conversion element 130d and disposed/located adjacent to the wavelength conversion element 130d, which is not limited by the invention.

Figure 8A:
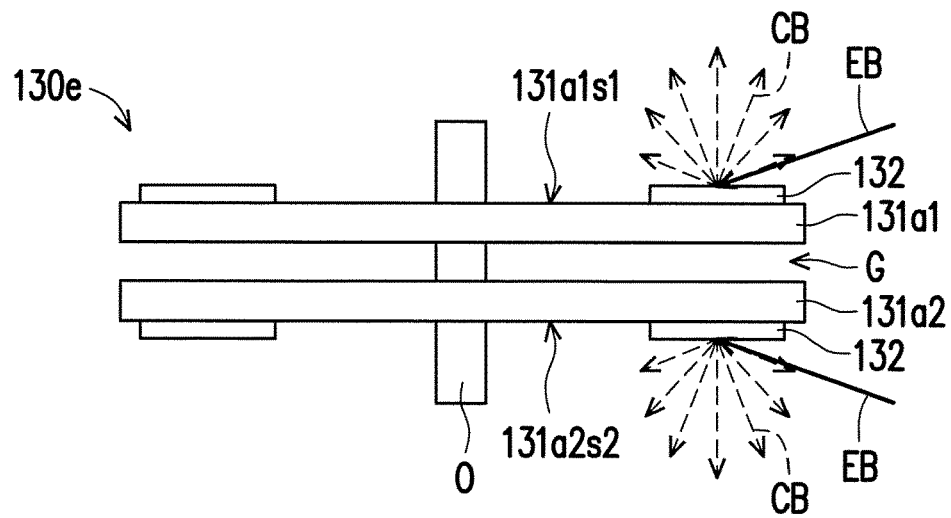
FIG. 8A is a cross-sectional view of a wavelength conversion element according to another embodiment of the invention.
Figure 8B:
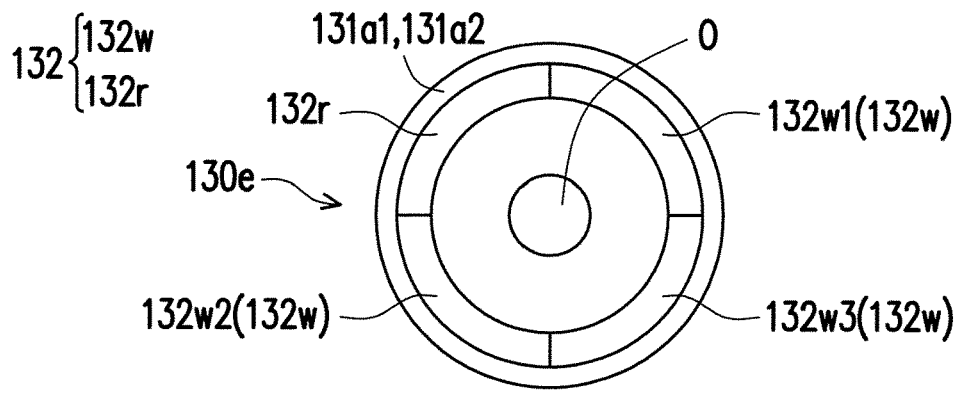
FIG. 8B is a top view of the wavelength conversion element of FIG. 8A.
Figure 8C:
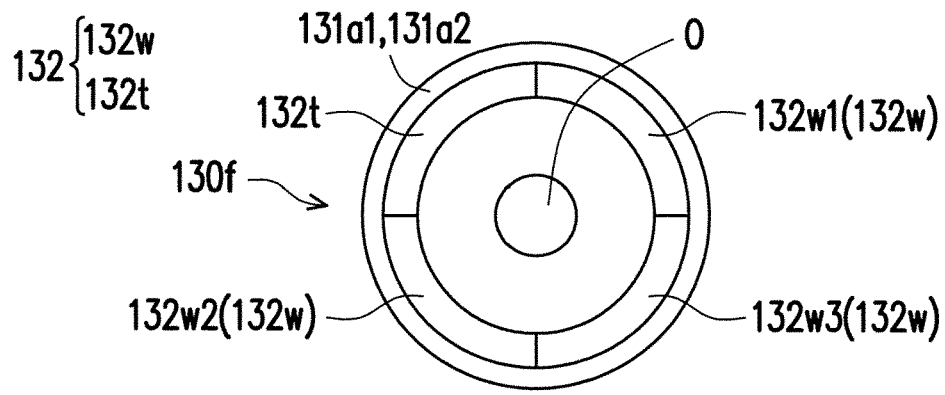
FIG. 8C and FIG. 8D are top views of two wavelength conversion elements according to another embodiment of the invention.
Figure 8D:
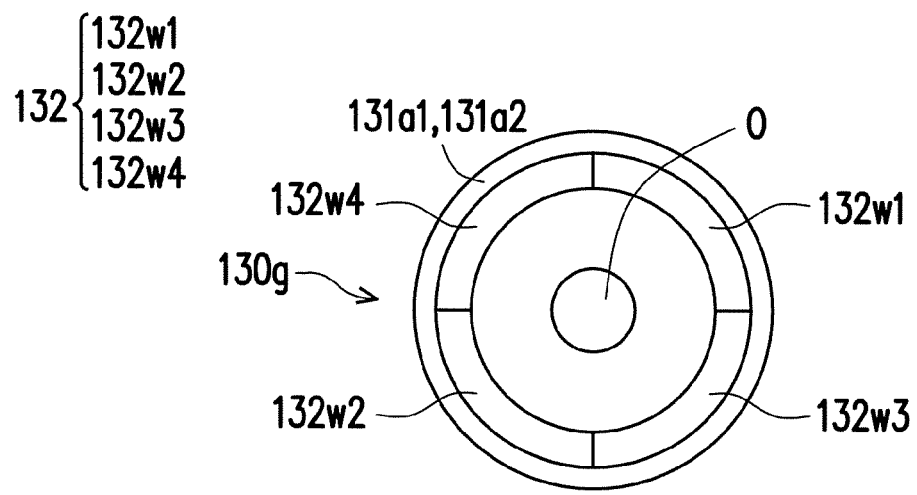
Figure 8E:
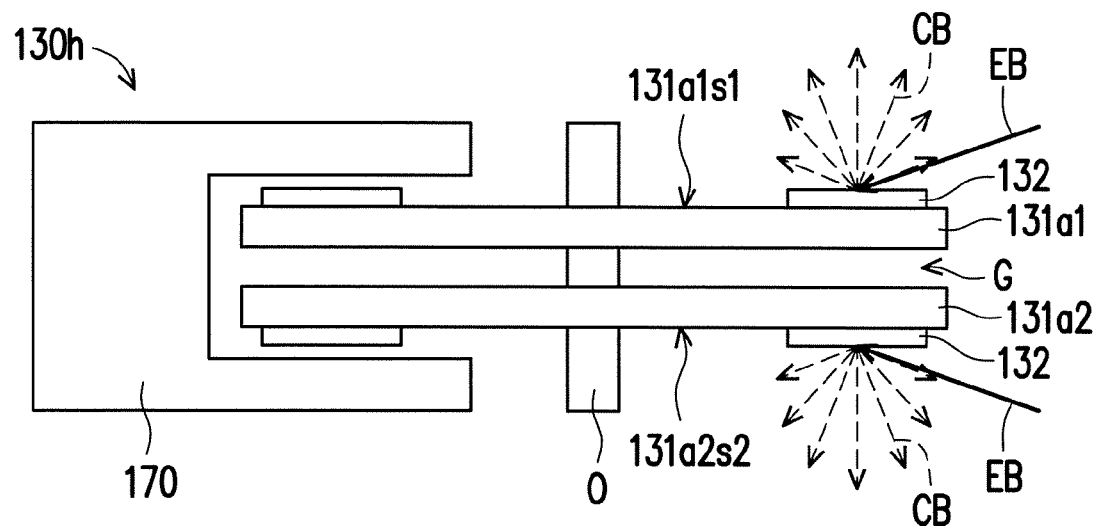
FIG. 8E is a cross-sectional view of a wavelength conversion element according to another embodiment of the invention.

FIG. 8A is a cross-sectional view of another one of the wavelength conversion elements of the aforementioned embodiments. FIG. 8B is a top view of the wavelength conversion element of FIG. 8A. FIG. 8C and FIG. 8D are top views of other two wavelength conversion elements in the aforementioned embodiments. FIG. 8E is a cross-sectional view of another one of the wavelength conversion elements of the aforementioned embodiments.

Referring to FIG. 8A and FIG. 8B, the wavelength conversion element 130e of FIG. 8A and FIG. 8B is similar to the wavelength conversion element 130a of FIG. 7A and FIG. 7B, and a main difference there between is that in the embodiment, the wavelength conversion element 130e includes a first carrier substrate 131a1 and a second carrier substrate 131a2, and the wavelength conversion element 130e has a gap G between the first carrier substrate 131a1 and the second carrier substrate 131a2. In the embodiment, the wavelength conversion element 130e is, for example, formed by two phosphor wheels spaced by the gap G, and the two phosphor wheels respectively have the first carrier substrate 131a1 and the second carrier substrate 131a2. In the embodiment, the light-action region 132 of the wavelength conversion element 130e is disposed/located on a surface 131a1s1 of the first carrier substrate 131a1 away from the second carrier substrate 131a2 and a surface 131a2s2 of the second carrier substrate 131a2 away from the first carrier substrate 131a1, and the light-action region 132 on the surface 131a1s1 and the light-action region 132 on the surface 131a2s2 respectively receive two rays of the excitation beams EB (shown in FIG. 6) coming from two light sources 110. In the embodiment, the first carrier substrate 131a1 and the second carrier substrate 131a2 are, for example, reflective substrates or reflecting substrates, and a material thereof is, for example, metal, alloy, ceramics, or a combination thereof. In the embodiment, the light-action region 132 includes at least one wavelength conversion region 132w and a light reflection region 132r. The at least one wavelength conversion region 132w, for example, includes three wavelength conversion regions 132w1, 132w2 and 132w3, though the invention is not limited thereto.

Referring to FIG. 8C, the wavelength conversion element 130f shown in FIG. 8C is similar to the wavelength conversion element 130e shown in FIG. 8B, and a main difference there between is that in the embodiment, the light-action region 132 of the wavelength conversion element 130f includes at least one wavelength conversion region 132w and a light transmissive region 132t. The light transmissive region 132t is, for example, an opening of the first carrier substrate 131a1/the second carrier substrate 131a2, such that the excitation beam EB may pass there through, and the excitation beam EB passing through the light transmissive region 132t is further transmitted to the reflection cover 120. Moreover, in some embodiments, a transparent material may be further configured in the light transmissive region 132t, i.e. the transparent material is disposed/located on the opening of the first carrier substrate 131a1/the second carrier substrate 131a2 to form the light transmissive region 132t. The transparent material is, for example, a transparent glass or a transparent diffuser, wherein the transparent diffuser diffuses the excitation beam EB passing through the light transmissive region 132t, so as to improve the image quality of the projection apparatus of the embodiments of the invention. However, the design parameters such as an arranging manner and region area proportions of the yellow light wavelength conversion region 132w1, the green light wavelength conversion region 132w2, the red light wavelength conversion region 132w3, and the light transmissive region 132t may be determined according to an actual design requirement, the wavelength conversion element 130f of the embodiment is not limited to the pattern shown in FIG. 8C.

Referring to FIG. 8D, the wavelength conversion element 130g shown in FIG. 8D is similar to the wavelength conversion element 130e shown in FIG. 8B, and a main difference there between is that in the embodiment, the at least one wavelength conversion region of the light-action region 132 is the yellow light wavelength conversion region 132w1, the green light wavelength conversion region 132w2, the red light wavelength conversion region 132w3, and the blue light wavelength conversion region 132w4. A yellow light wavelength conversion material is, for example, configured in the yellow light wavelength conversion region 132w1 to convert the excitation beam EB (shown in FIG. 6) into a yellow color conversion beam CB. A green light wavelength conversion material is, for example, configured in the green light wavelength conversion region 132w2 to convert the excitation beam EB (shown in FIG. 6) into a green color conversion beam CB. A red light wavelength conversion material is, for example, configured in the red light wavelength conversion region 132w3 to convert the excitation beam EB (shown in FIG. 6) into a red color conversion beam CB. A blue light wavelength conversion material is, for example, configured in the blue light wavelength conversion region 132w4 to convert the excitation beam EB (shown in FIG. 6) into a blue color conversion beam CB. In the embodiment, the excitation beam EB is, for example, a blue color excitation beam with a first wavelength, and the blue color conversion beam CB converted by the blue light wavelength conversion region 132w4 has a second wavelength, wherein the first wavelength is smaller than the second wavelength. In other embodiment, a wavelength range of the excitation beam EB is, for example, lower than a wavelength range of the blue light (for example, ultraviolet light), such that the blue light wavelength conversion material may be excited to emit the blue color conversion beam CB. However, design parameters such as an arranging manner and region area proportions of the yellow light wavelength conversion region 132w1, the green light wavelength conversion region 132w2, the red light wavelength conversion region 132w3, and the blue light wavelength conversion region 132w4 may be determined according to an actual design requirement, the wavelength conversion element 130g of the embodiment is not limited to the pattern shown in FIG. 8D.

Referring to FIG. 8E, the wavelength conversion element 130h shown in FIG. 8E is similar to the wavelength conversion element 130e shown in FIG. 8A, and a main difference there between is that in the embodiment, the illumination system further includes a heat dissipation module 170. The heat dissipation module 170 is disposed/located adjacent to the wavelength conversion element 130h, the gap G between the first carrier substrate 131a 1 and the second carrier substrate 131a2 routes through the heat dissipation module 170 or is disposed/located in/at the heat dissipation module 170. In the embodiment, the heat dissipation module 170, for example, includes an airflow driving element, though the invention is not limited thereto. In the embodiment, besides that the airflow driving element may drive airflow near the wavelength conversion element 130h, but may also drive the airflow within the gap G, such that the wavelength conversion element 130h continuously exchanges heat with the airflow having a lower temperature. In the embodiment, the airflow driving element is, for example, a fan, though the invention is not limited thereto. In this way, besides that the heat dissipation module 170 may improve the heat dissipation capability of the wavelength conversion element 130h, the heat dissipation module 170 may also quickly dissipate the heat of the wavelength conversion material generated under a long time irradiation of the excitation beam EB, such that the phenomenon of low light-emitting efficiency caused by overheat is correspondingly mitigated, and accordingly the reliability of the projection apparatus of the embodiments of the invention is improved. However, in other embodiment, the heat dissipation module may be both fixed on the wavelength conversion element 130d and disposed/located adjacent to the wavelength conversion element 130d, which is not limited by the invention.

Figure 9A:
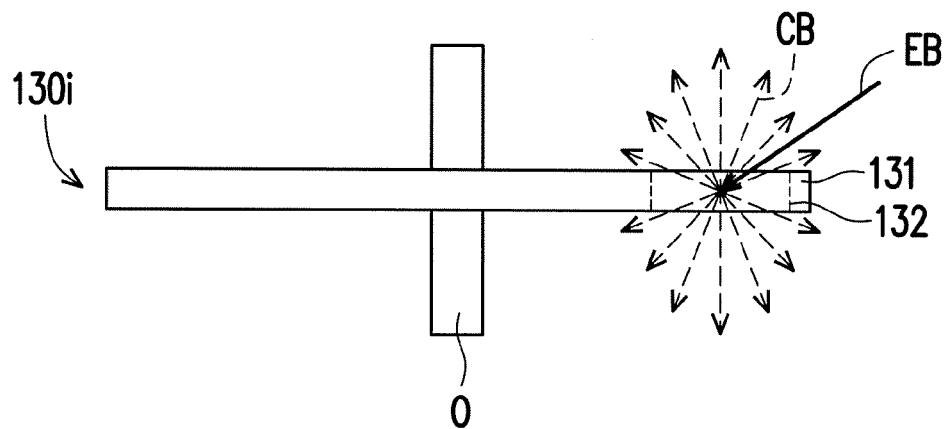
FIG. 9A is a cross-sectional view of a wavelength conversion element according to another embodiment of the invention.
Figure 9B:
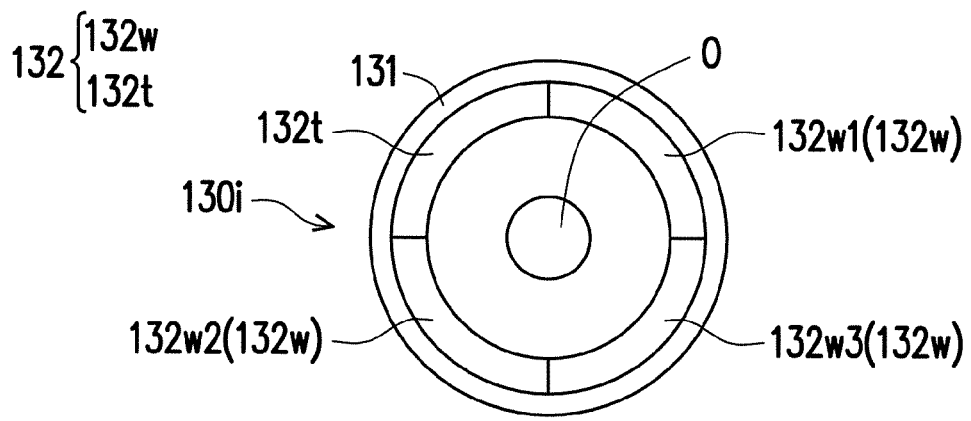
FIG. 9B is a top view of the wavelength conversion element of FIG. 9A.
Figure 9C:
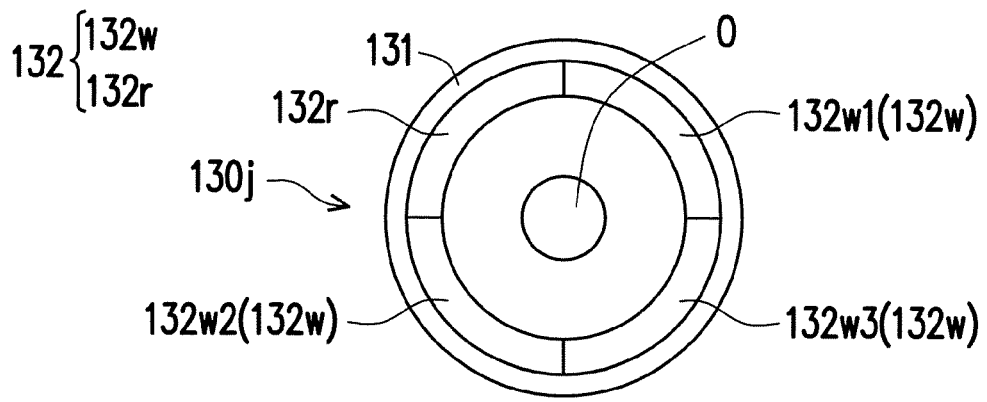
FIG. 9C and FIG. 9D are top views of two wavelength conversion elements according to another embodiment of the invention.
Figure 9D:
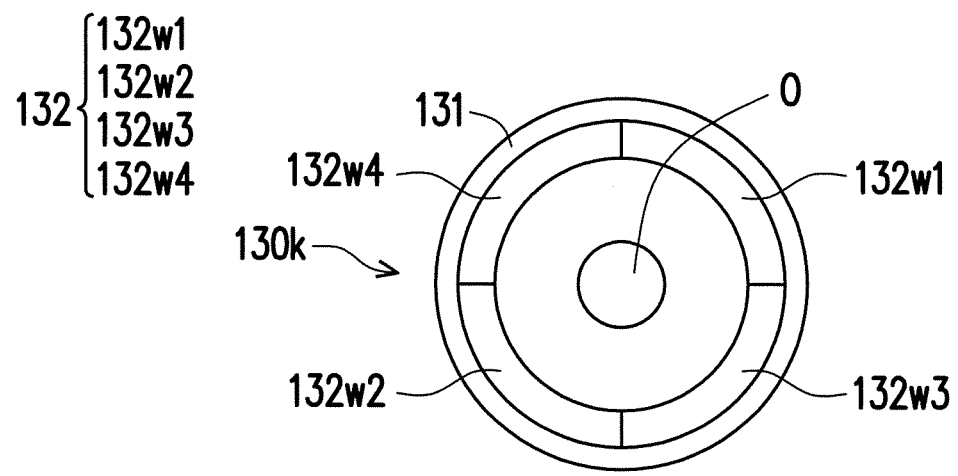
Figure 9E:
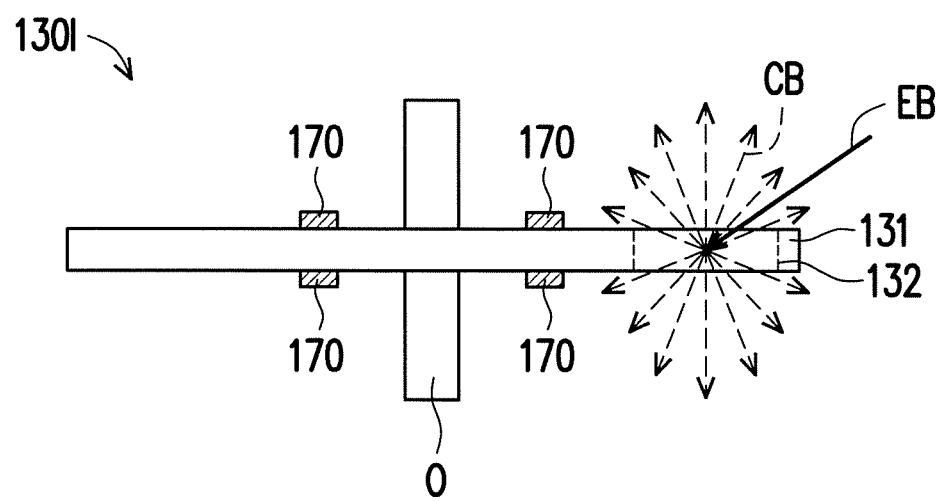
FIG. 9E is a cross-sectional view of a wavelength conversion element according to another embodiment of the invention.

FIG. 9A is a cross-sectional view of another one of the wavelength conversion elements of the aforementioned embodiments. FIG. 9B is a top view of the wavelength conversion element of FIG. 9A. FIG. 9C and FIG. 9D are top views of other two wavelength conversion elements in the aforementioned embodiments. FIG. 9E is a cross-sectional view of another one of the wavelength conversion elements of the aforementioned embodiments.

Referring to FIG. 9A and FIG. 9B, the wavelength conversion element 130i of FIG. 9A and FIG. 9B is similar to the wavelength conversion element 130a of FIG. 7A and FIG. 7B, and a main difference there between is that in the embodiment, at least one wavelength conversion region 132w in the light-action region 132 of the wavelength conversion element 130i is, for example, a light pervious element (transparent element). To be specific, in the embodiment, the light-action region 132 of the wavelength conversion element 130i includes at least one wavelength conversion region 132w and a light transmissive region 132t. When the excitation beam EB (shown in FIG. 1-FIG. 5) irradiates the wavelength conversion region 132w, the wavelength conversion region 132w converts the excitation beam EB into the conversion beam CB, and the conversion beam CB may penetrate through the wavelength conversion region 132w. When the excitation beam EB (shown in FIG. 1-FIG. 5) irradiates the light transmissive region 132t, the excitation beam EB may penetrate through the light transmissive region 132t. In the embodiment, the at least one wavelength conversion region 132w is, for example, the yellow light wavelength conversion region 132w1, the green light wavelength conversion region 132w2, and the red light wavelength conversion region 132w3. In the embodiment, the light transmissive region 132t is, for example, an opening of the carrier substrate 131 of the wavelength conversion element 130i. In some embodiments, a transparent material may be further configured in the light transmissive region 132t (for example, a transparent glass or a transparent diffuser). In the embodiment, the yellow light wavelength conversion material, the green light wavelength conversion material and the red light wavelength conversion material may be respectively configured in the yellow light wavelength conversion region 132w1, the green light wavelength conversion region 132w2, and the red light wavelength conversion region 132w3.

Referring to FIG. 9C, the wavelength conversion element 130j shown in FIG. 9C is similar to the wavelength conversion element 130i shown in FIG. 9B, and a main difference there between is that in the embodiment, the light-action region 132 of the wavelength conversion element 130j includes at least one wavelength conversion region 132w and a light reflection region 132r. In the embodiment, when the excitation beam EB (shown in FIG. 1-FIG. 5) irradiates the wavelength conversion region 132w, the wavelength conversion region 132w converts the excitation beam EB into the conversion beam CB, and the conversion beam CB is reflected by the wavelength conversion region 132w. When the excitation beam EB (shown in FIG. 1-FIG. 5) irradiates the light reflection region 132r, the light reflection region 132r reflects the excitation beam EB. In the embodiment, the light reflection region 132r is, for example, a reflection element disposed/located on the wavelength conversion element 130j, though the invention is not limited thereto.

Referring to FIG. 9D, the wavelength conversion element 130k shown in FIG. 9D is similar to the wavelength conversion element 130i shown in FIG. 9B, and a main difference there between is that in the embodiment, the at least one wavelength conversion region of the light-action region 132 is the yellow light wavelength conversion region 132w1, the green light wavelength conversion region 132w2, the red light wavelength conversion region 132w3, and the blue light wavelength conversion region 132w4. A yellow light wavelength conversion material is, for example, configured in the yellow light wavelength conversion region 132w1 to convert the excitation beam EB (shown in FIG. 1-FIG. 5) into a yellow color conversion beam CB. A green light wavelength conversion material is, for example, configured in the green light wavelength conversion region 132w2 to convert the excitation beam EB (shown in FIG. 1-FIG. 5) into a green color conversion beam CB. A red light wavelength conversion material is, for example, configured in the red light wavelength conversion region 132w3 to convert the excitation beam EB (shown in FIG. 1-FIG. 5) into a red color conversion beam CB. A blue light wavelength conversion material is, for example, configured in the blue light wavelength conversion region 132w4 to convert the excitation beam EB (shown in FIG. 1-FIG. 5) into a blue color conversion beam CB. In the embodiment, the excitation beam EB is, for example, a blue color excitation beam with a first wavelength, and the blue color conversion beam CB converted by the blue light wavelength conversion region 132w4 has a second wavelength, wherein the first wavelength is smaller than the second wavelength. In other embodiment, a wavelength range of the excitation beam EB is, for example, lower than a wavelength range of the blue light (for example, ultraviolet light), such that the blue light wavelength conversion material may be excited to emit the blue color conversion beam CB. However, it should be noted that design parameters such as an arranging manner and region area proportions of the yellow light wavelength conversion region 132w1, the green light wavelength conversion region 132w2, the red light wavelength conversion region 132w3, and the blue light wavelength conversion region 132w4 may be determined according to an actual design requirement, the wavelength conversion element 130k of the embodiment is not limited to the pattern shown in FIG. 9D.

Referring to FIG. 9E, the wavelength conversion element 130l shown in FIG. 9E is similar to the wavelength conversion element 130i shown in FIG. 9A, and a main difference there between is that in the embodiment, the illumination system further includes a heat dissipation module 170. In the embodiment, the heat dissipation module 170 is fixed on the wavelength conversion element 130l to cool down the wavelength conversion element 130l. In this way, the heat dissipation module 170 may quickly dissipate the heat of the wavelength conversion material generated under a long time irradiation of the excitation beam EB, such that the phenomenon of low light-emitting efficiency caused by overheat is correspondingly mitigated, and accordingly the reliability of the projection apparatus of the embodiments of the invention is improved. In the embodiment, the heat dissipation module 170 is, for example, a heat dissipation structure formed on the carrier substrate 131, or a heat dissipation assembly set on the carrier substrate 131, which is not limited by the invention. However, in other embodiment, the heat dissipation module may be both fixed on the wavelength conversion element 130l and disposed/located adjacent to the wavelength conversion element 130l, which is not limited by the invention.

In summary, the embodiment of the invention has at least one of the following advantages or effects. In the illumination system of the embodiment of the invention, the focal point of the reflection cover is disposed/located on the extension line of the transmission path of the excitation beam, so that the excitation beam emitted by the light source is reflected to the focal point of the reflection cover. In the embodiment of the invention, since the light-action region of the wavelength conversion element is disposed/located adjacent to the focal point of the reflection cover, when the excitation beam is converted into the conversion beam by the light-action region of the wavelength conversion element, a position (i.e. the light-action region) where the conversion beam is emitted is also adjacent to the focal point of the reflection cover, so that the illumination system is unnecessary to configure additional optical guide elements or optical path to guide the excitation beam. Therefore, the illumination system of the embodiment of the invention has advantages of small volume, simple design of optical path and low cost, etc. Further, since the projection apparatus of the embodiment of the invention includes the aforementioned illumination system, the projection apparatus of the embodiment of the invention also has the advantages of small volume, simple design of optical path and low cost, etc.

In the embodiments of the invention, the light-action region of the wavelength conversion element of the illumination system may be disposed/located on two opposite surfaces of a single substrate or on two surfaces of two substrates, and the excitation beam may be designed to be transmitted to the light-action region on the aforementioned different surfaces. In the embodiments of the invention, since the conversion beam may be emitted from the light-action region disposed/located on the different surfaces, in case of a same image brightness output, the light intensity of the excitation beam may be decreased to decrease an energy density taken by the wavelength conversion material in the wavelength conversion region, by which a phenomenon of low light-emitting efficiency caused by overheat of the wavelength conversion material under long time irradiation of the excitation beam is avoided. In the embodiments of the invention, since the heat dissipation module of the illumination system is fixed on the wavelength conversion element or disposed/located adjacent to the wavelength conversion element, the heat dissipation module may quickly dissipate the heat of the wavelength conversion material generated under a long time irradiation of the excitation beam, such that the phenomenon of low light-emitting efficiency caused by overheat is correspondingly mitigated, and accordingly the reliability of the projection apparatus of the embodiments of the invention is improved.

Moreover, in the embodiment of the invention, since the light-action region in the wavelength conversion element of the illumination system includes the light reflection region having the scattering function, when the excitation beam irradiates the light reflection region, the excitation beam is evenly scattered, which may effectively mitigate or avoid the speckle phenomenon caused by the excitation beam, so as to improve the image quality of the projection apparatus of the embodiments of the invention.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents. Moreover, any embodiment of or the claims of the invention is unnecessary to implement all advantages or features disclosed by the invention. Moreover, the abstract and the name of the invention are only used to assist patent searching. Moreover, "first", "second", etc. mentioned in the specification and the claims are merely used to name the elements and should not be regarded as limiting the upper or lower bound of the number of the components/devices.

What is claimed is:
1. A projection apparatus, comprising:
an illumination system, comprising:
at least one light source, adapted to provide at least one excitation beam;
a reflection cover, having a focal point and an opening, wherein the focal point of the reflection cover is disposed on an extension line of a transmission path of the excitation beam, and the opening is disposed adjacent to the focal point;

a wavelength conversion element, penetrating through the opening, and having a light-action region, wherein the light-action region of the wavelength conversion element is disposed on the transmission path of the excitation beam, and is disposed adjacent to the focal point of the reflection cover, and is adapted to convert the excitation beam into a conversion beam, wherein the reflection cover is disposed on a transmission path of the conversion beam from the wavelength conversion element; and a filter element, disposed on a transmission path of the conversion beam from the reflection cover, wherein the conversion beam from the reflection cover is obliquely incident to the filter element, and the filter element is adapted to filter the conversion beam into an illumination beam;

a light valve, disposed on a transmission path of the illumination beam, and adapted to convert the illumination beam into an image beam; and an imaging system, disposed on a transmission path of the image beam, wherein a surface of the reflection cover is a parabolic surface or a partial ellipsoidal surface having the focal point, and is adapted to reflect the conversion beam from the wavelength conversion element, wherein another focal point of the partial ellipsoidal surface is away from the wavelength conversion element and disposed adjacent to the filter element.

2. The projection apparatus as claimed in claim 1, wherein the wavelength conversion element comprises a carrier substrate, the light-action region of the wavelength conversion element is disposed on two opposite surfaces of the carrier substrate, and the light-action region comprises:

at least one wavelength conversion region, adapted to convert the excitation beam into the conversion beam; and a light reflection region, adapted to reflect the excitation beam, wherein the light reflection region and the wavelength conversion region are adapted to cut into the transmission path of the excitation beam by turns.

3. The projection apparatus as claimed in claim 1, wherein the wavelength conversion element comprises a first carrier substrate and a second carrier substrate, the light-action region of the wavelength conversion element is disposed on a surface of the first carrier substrate away from the second carrier substrate and on a surface of the second carrier substrate away from the first carrier substrate, and the light-action region comprises:

at least one wavelength conversion region, adapted to convert the excitation beam into the conversion beam; and a light reflection region, adapted to reflect the excitation beam, wherein the light reflection region and the wavelength conversion region are adapted to cut into the transmission path of the excitation beam by turns.

4. The projection apparatus as claimed in claim 1, wherein the wavelength conversion element is a light pervious element, and the light-action region comprises:

at least one wavelength conversion region, adapted to convert the excitation beam into the conversion beam; and a light transmissive region, adapted to allow the excitation beam to pass through, wherein the light transmissive region and the wavelength conversion region are adapted to cut into the transmission path of the excitation beam by turns.

5. The projection apparatus as claimed in claim 1, wherein the illumination system further comprises a converging lens, wherein the parabolic surface reflects the conversion beam from the wavelength conversion element to the converging lens in parallel, and the converging lens converges the conversion beam from the parabolic surface to the filter element.

6. The projection apparatus as claimed in claim 1, wherein the illumination system further comprises at least one reflection mirror disposed on the transmission path of the excitation beam from the light source, and the reflection mirror obliquely reflects the excitation beam to the wavelength conversion element.

7. The projection apparatus as claimed in claim 1, wherein the illumination system further comprises a heat dissipation module adapted to dissipate heat of the wavelength conversion element.

8. The projection apparatus as claimed in claim 7, wherein the wavelength conversion element has a gap, and the gap routes through the heat dissipation module.

9. The projection apparatus as claimed in claim 1, further comprising:

a light optimization element, disposed between the filter element and the light valve.

10. An illumination system, comprising:

at least one light source, adapted to provide at least one excitation beam;

a reflection cover, having a focal point and an opening, wherein the focal point of the reflection cover is disposed on an extension line of a transmission path of the excitation beam, and the opening is disposed adjacent to the focal point;

a wavelength conversion element, penetrating through the opening, and having a light-action region, wherein the light-action region of the wavelength conversion element is disposed on the transmission path of the excitation beam, and is disposed adjacent to the focal point of the reflection cover, and is adapted to convert the excitation beam into a conversion beam, wherein the reflection cover is disposed on a transmission path of the conversion beam from the wavelength conversion element; and a filter element, disposed on a transmission path of the conversion beam from the reflection cover, wherein the conversion beam from the reflection cover is obliquely incident to the filter element, and the filter element is adapted to filter the conversion beam, wherein a surface of the reflection cover is a parabolic surface or a partial ellipsoidal surface having the focal point, and is adapted to reflect the conversion beam from the wavelength conversion element, wherein another focal point of the partial ellipsoidal surface is away from the wavelength conversion element and disposed adjacent to the filter element.

11. The illumination system as claimed in claim 10, wherein the wavelength conversion element comprises a carrier substrate, the light-action region of the wavelength conversion element is disposed on two opposite surfaces of the carrier substrate, and the light-action region comprises:

at least one wavelength conversion region, adapted to convert the excitation beam into the conversion beam; and a light reflection region, adapted to reflect the excitation beam, wherein the light reflection region and the wave- 12. The illumination system as claimed in claim 10, wherein the wavelength conversion element comprises a first carrier substrate and a second carrier substrate, the light-action region of the wavelength conversion element is disposed on a surface of the first carrier substrate away from the second carrier substrate and on a surface of the second carrier substrate away from the first carrier substrate, and the light-action region comprises:
- at least one wavelength conversion region, adapted to convert the excitation beam into the conversion beam; and
- a light reflection region, adapted to reflect the excitation beam, wherein the light reflection region and the wavelength conversion region are adapted to cut into the transmission path of the excitation beam by turns.

13. The illumination system as claimed in claim 10, wherein the wavelength conversion element is a light pervious element, and the light-action region comprises:
- at least one wavelength conversion region, adapted to convert the excitation beam into the conversion beam; and
- a light transmissive region, adapted to allow the excitation beam to pass through, wherein the light transmissive region and the wavelength conversion region are adapted to cut into the transmission path of the excitation beam by turns.

14. The illumination system as claimed in claim 10, further comprising:
- a converging lens, wherein the parabolic surface reflects the conversion beam from the wavelength conversion element to the converging lens in parallel, and the converging lens converges the conversion beam from the parabolic surface to the filter element.

15. The illumination system as claimed in claim 10, further comprising:
- at least one reflection mirror, disposed on the transmission path of the excitation beam from the light source, wherein the reflection mirror obliquely reflects the excitation beam to the wavelength conversion element.

16. The illumination system as claimed in claim 10, further comprising:
- a heat dissipation module, adapted to dissipate heat of the wavelength conversion element.

17. The illumination system as claimed in claim 16, wherein the wavelength conversion element has a gap, and the gap routes through the heat dissipation module.

18. A projection apparatus, comprising:
- an illumination system, comprising:
  - at least one light source, adapted to provide at least one excitation beam;
  - a reflection cover, having a focal point and an opening, wherein the focal point of the reflection cover is disposed on an extension line of a transmission path of the excitation beam, and the opening is disposed adjacent to the focal point;
  - a wavelength conversion element, penetrating through the opening, and having a light-action region, wherein the light-action region of the wavelength conversion element is disposed on the transmission path of the excitation beam, and is disposed adjacent to the focal point of the reflection cover, and is adapted to convert the excitation beam into a conversion beam, wherein the reflection cover is disposed on a transmission path of the conversion beam from the wavelength conversion element, the wavelength conversion element comprises a first carrier substrate and a second carrier substrate, the light-action region of the wavelength conversion element is disposed on a surface of the first carrier substrate away from the second carrier substrate and on a surface of the second carrier substrate away from the first carrier substrate, and the light-action region comprises:
    - at least one wavelength conversion region, adapted to convert the excitation beam into the conversion beam; and
    - a light reflection region, adapted to reflect the excitation beam, wherein the light reflection region and the wavelength conversion region are adapted to cut into the transmission path of the excitation beam by turns; and
  - a filter element, disposed on a transmission path of the conversion beam from the reflection cover, wherein the conversion beam from the reflection cover is obliquely incident to the filter element, and the filter element is adapted to filter the conversion beam into an illumination beam;
- a light valve, disposed on a transmission path of the illumination beam, and adapted to convert the illumination beam into an image beam; and
- an imaging system, disposed on a transmission path of the image beam.

19. An illumination system, comprising:
- at least one light source, adapted to provide at least one excitation beam;
- a reflection cover, having a focal point and an opening, wherein the focal point of the reflection cover is disposed on an extension line of a transmission path of the excitation beam, and the opening is disposed adjacent to the focal point;
- a wavelength conversion element, penetrating through the opening, and having a light-action region, wherein the light-action region of the wavelength conversion element is disposed on the transmission path of the excitation beam, and is disposed adjacent to the focal point of the reflection cover, and is adapted to convert the excitation beam into a conversion beam, wherein the reflection cover is disposed on a transmission path of the conversion beam from the wavelength conversion element, the wavelength conversion element comprises a first carrier substrate and a second carrier substrate, the light-action region of the wavelength conversion element is disposed on a surface of the first carrier substrate away from the second carrier substrate and on a surface of the second carrier substrate away from the first carrier substrate, and the light-action region comprises:
  - at least one wavelength conversion region, adapted to convert the excitation beam into the conversion beam; and
  - a light reflection region, adapted to reflect the excitation beam, wherein the light reflection region and the wavelength conversion region are adapted to cut into the transmission path of the excitation beam by turns; and
- a filter element, disposed on a transmission path of the conversion beam from the reflection cover, wherein the conversion beam from the reflection cover is obliquely incident to the filter element, and the filter element is adapted to filter the conversion beam.

* * * * *